US006684018B2

(12) United States Patent
Arai et al.

(10) Patent No.: US 6,684,018 B2
(45) Date of Patent: Jan. 27, 2004

(54) LOW-DISPERSION OPTICAL FIBER AND OPTICAL TRANSMISSION SYSTEM USING THE LOW-DISPERSION OPTICAL FIBER

(75) Inventors: Shinichi Arai, Chiyoda-Ku (JP); Ryuichi Sugizaki, Chiyoda-Ku (JP); Keiichi Aiso, Chiyoda-Ku (JP); Naoto Oyama, Chiyoda-Ku (JP); Jun Terada, Chiyoda-Ku (JP); Hisashi Koaizawa, Chiyoda-Ku (JP); Katsunori Inoue, Chiyoda-Ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 110 days.

(21) Appl. No.: 09/983,616

(22) Filed: Oct. 25, 2001

(65) Prior Publication Data

US 2002/0102085 A1 Aug. 1, 2002

Related U.S. Application Data

(63) Continuation of application No. PCT/JP01/01353, filed on Feb. 23, 2001.

(30) Foreign Application Priority Data

Feb. 25, 2000 (JP) ........................................ 2000-049089

(51) Int. Cl.$^7$ ................................................. G02B 6/02
(52) U.S. Cl. ........................ 385/127; 385/126; 385/124; 385/123; 398/147
(58) Field of Search ................................ 385/123, 124, 385/125, 126, 127, 128, 141; 398/147

(56) References Cited

U.S. PATENT DOCUMENTS

| | | | | |
|---|---|---|---|---|
| 5,721,800 A | * | 2/1998 | Kato et al. | 385/127 |
| 5,732,178 A | * | 3/1998 | Terasawa et al. | 385/127 |
| 5,822,488 A | * | 10/1998 | Terasawa et al. | 385/127 |
| 6,055,353 A | | 4/2000 | Aiso | 385/123 |
| 6,449,416 B1 | * | 9/2002 | Lee et al. | 385/127 |
| 6,532,331 B1 | * | 3/2003 | Kato et al. | 385/123 |

FOREIGN PATENT DOCUMENTS

| | | | |
|---|---|---|---|
| DE | 19712828 A1 | 10/1998 | ............. 385/123 X |
| EP | 0 938 001 | 8/1999 | ............. 385/123 X |
| JP | 11-84159 | 3/1999 | ............. 385/123 X |
| WO | WO98/04941 | 2/1998 | ............. 385/123 X |
| WO | WO99/30193 | 6/1999 | ............. 385/123 X |
| WO | WO00/63732 | 10/2000 | ............. 385/123 X |
| WO | WO00/70378 | 11/2000 | ............. 385/123 X |

OTHER PUBLICATIONS

Mukasa, U.S. patent application Publication No. U.S. 2003/0095768A1, published May 22, 2003.*
Arai et al., U.S. patent application Publication No. U.S. 2002/0102085 A1, published Aug. 1, 2002.*
Mukasa, U.S. patent application Publication No. U.S. 2001/0021298 A1, published Sep. 13, 2001.*
Non–zero Dispersion Shifted Fiber with Low Dispersion Slope; L. Jie et al, Proceedings of APCC/OECC '99, Oct. 18–22, 1999, Beijing, China, pp. 1373–1374.
Design and Fabrication of Locally Dispersion–Flattened Large Effective Area Fibers; Y. Liu et al, ECOC '98, Sep. 22–24, 1998, Madrid, Spain, pp. 37–38.
Practically Feasible Dispersion Flattened Fibers Produced by Vad Technique; Y. Yokoyama et al; ECOC '98, Sep. 22–24, 1998, Madrid, Spain, pp. 131–132.

* cited by examiner

*Primary Examiner*—Brian Healy
(74) *Attorney, Agent, or Firm*—Oblon, Spivak, McClelland, Maier & Neustadt, P.C.

(57) ABSTRACT

A low-dispersion optical fiber provides both reduced chromatic dispersion in a used wavelength band and increased effective core area. The low-dispersion optical fiber is made by covering a center core (1) with a first side core (2), covering the first side core (2) with a second side core (3), and covering the second side core (3) with a cladding (5). When the maximum refractive index of the center core (1) is written n1, the minimum refractive index of the first side core (2) is written n2, the maximum refractive index of the second side core (3) is written n3 and the refractive index of the cladding (5) is written nc, then n1>n3>nc>n2 is satisfied. Relative refractive index differences $\Delta1$, $\Delta2$ and $\Delta3$ with respect to the cladding (5) of the maximum refractive index of the center core (1), the minimum refractive index of the first side core (2) and the maximum refractive index of the second side core (3) respectively are made $0.4\% \leq \Delta1 \geq 0.7\%$, $-0.30\% \leq \Delta2 \leq -0.05\%$ and $0.2\% \leq \Delta3$.

20 Claims, 4 Drawing Sheets

LOW-DISPERSION OPTICAL FIBER AND OPTICAL TRANSMISSION SYSTEM USING THE LOW-DISPERSION OPTICAL FIBER

This Application is a Continuation of application No. PCT/JP01/01353 filed Feb. 23, 2001.

TECHNICAL FIELD

This invention relates to a low-dispersion optical fiber used for example when wavelength division multiplexing optical transmission is carried out in the 1.5 μm band, and to an optical transmission system using this low-dispersion optical fiber.

BACKGROUND ART

With the development of the information society the amount of information communicated has been increasing dramatically, and the realization of high bit-rate and high capacities in optical fiber communications has become an urgent and unavoidable issue. As an approach to this realization of more high bit-rate and capacities, optical fiber type optical amplifiers, which by using an optical fiber doped with a rare earth element, such as an erbium-doped optical fiber (EDF) doped with $Er^{3+}$, can amplify an optical signal in the form of light, have been developed. And with the development the optical amplifiers which uses those optical fiber, the realization of high-power signal light has been progressing rapidly.

Meanwhile, to increase communication capacities in optical communications, communications using wavelength division multiplexing optical transmission, wherein optical signals having different wavelengths are transmitted down a single optical fiber, have been being developed. And from the application of the optical amplifier which uses above-mentioned optical fiber to optical communication using this wavelength division multiplexing optical transmission (wavelength multiplexing optical transmission systems), further increases in communication capacity and the realization of long-distance transmission are anticipated.

One representative example of an optical fiber type optical amplifier is the EDFA (Erbium-Doped optical Fiber Amplifier), which has an EDF of the kind mentioned above. The use of the EDFA to conduct the above-mentioned wavelength division multiplexing optical transmission with the 1.5 μm wavelength band (wavelength 1520 nm to 1620 nm), which is the gain band of the EDFA, as the transmission band has been being studied.

Figure 6A:
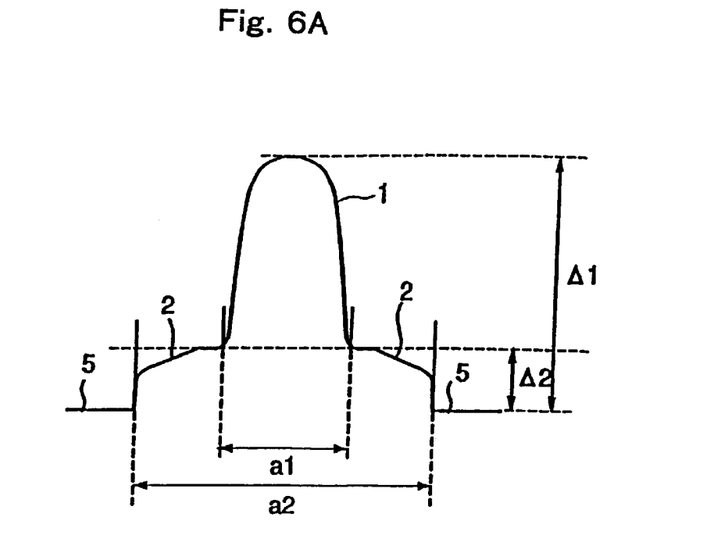
FIGS. 6A through 6C are explanatory views showing the refractive index distributions (refractive index distributions over a cross-section) in the radial direction of optical fibers proposed for wavelength division multiplexing optical transmission use in related art.
Figure 6B:
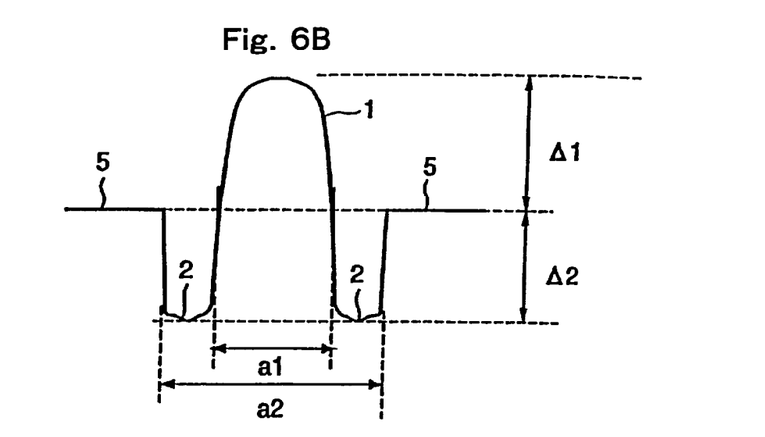

FIGS. 6A and 6B show examples of refractive index profiles of optical fibers that have been proposed in related art as optical fibers for wavelength division multiplexing optical transmission with, of the above-mentioned 1.5 μm wavelength band, particularly the 1550 nm vicinity wavelength band (the 1.55 μm wavelength band) as the transmission band (used wavelength band). FIG. 6A shows a dual shaped refractive index profile, and FIG. 6B shows a W-shaped refractive index profile.

The optical fiber with the dual shaped refractive index profile is made up of a cladding 5, a center core 1 having a larger refractive index than that of the cladding 5, and a first side core 2 having a refractive index smaller than that of the center core 1 but larger than that of the cladding 5. The optical fiber with the W-shaped refractive index profile is made up of a cladding 5, a center core 1 having a larger refractive index than that of the cladding 5, and a first side core 2 having a refractive index smaller than that of the cladding 5.

Among optical fibers with the dual shaped refractive index profile described above, those having their zero dispersion wavelength in the 1.55 μm wavelength vicinity are called dispersion-shifted optical fibers. Because a dispersion-shifted optical fiber has its zero dispersion wavelength in the vicinity of the wavelength 1.55 μm, which is the center wavelength of the 1.55 μm wavelength band, distortion of the signal light waveform caused by dispersion in the 1.55 μm wavelength band is suppressed. On the down side, however, the occurrence of the nonlinear phenomenon of four-wave mixing is marked. Consequently, with this dispersion-shifted optical fiber, four-wave mixing light arising causes distortion to occur in the waveform of the signal light, and it is impossible to realize high-quality wavelength division multiplexing optical transmission.

To overcome this, dual shaped refractive index profile optical fibers having their zero dispersion wavelength shifted from the 1.55 μm wavelength band have been developed. However, it is known that in this kind of optical fiber the dispersion gradient in the 1.55 μm wavelength band is large. And because of that, with this kind of optical fiber it is difficult to make small the chromatic dispersion differential in the used wavelength band in wavelength division multiplexing optical transmission (the difference between the maximum value and the minimum value of the chromatic dispersion in the used wavelength band). Consequently, when this kind of optical fiber is used, it is not possible for the used wavelength band used for wavelength division multiplexing optical transmission to be made wide.

An optical fiber having the W-shaped refractive index profile functions as a dispersion flattened optical fiber, because the above-mentioned chromatic dispersion differential is small. However, whereas the effective core area (the region through which light effectively propagates: $A_{eff}$) of the dual shaped refractive index profile optical fiber is about 45 μm², the effective core area of a W-shaped refractive index profile optical fiber is for example about 30 μm², or about ⅔ of that of the dual shaped refractive index profile optical fiber. And when the effective core area is small like this, in wavelength division multiplexing optical transmission there has been the problem that the transmitted signal deteriorates as a result of nonlinear phenomena arising in the optical fiber.

Figure 6C:
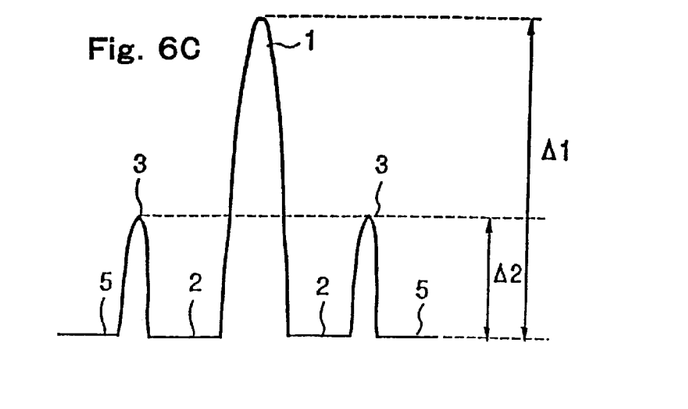

To overcome this, the idea of increasing the effective core area by using an optical fiber having a segment core refractive index profile of the kind shown in FIG. 6C has been proposed. In FIG. 6C, 1 denotes a center core; 2 a first side core; 3 a second side core; and 5 a cladding. However, with this kind of optical fiber, because the chromatic dispersion gradient in the 1.5 μm wavelength band is large and the chromatic dispersion differential in the same wavelength band is large, when the optical fiber of this proposal is applied to wavelength division multiplexing transmission, the problem arises that signal light waveform deterioration caused by chromatic dispersion becomes marked.

Also, to apply an optical fiber to a wavelength division multiplexing transmission system, the optical fiber must be incorporated into a cable. And because the cable is required to have the property that loss increases caused by bending of the optical fiber and side pressures on the optical fiber are low, it is also required of an optical fiber for wavelength division multiplexing transmission use that its bending property be good.

However, as explained above, there has not yet been realized an optical fiber with which it is possible to obtain both the effective core area and the reduced chromatic dispersion differential necessary to realize a high-quality wavelength division multiplexing transmission system, and additionally it has been difficult to realize an optical fiber whose bending loss property are also good.

Also, in recent years, as optical amplifiers, the Raman amplifier has been approaching practical introduction. The Raman amplifier has a wider amplifiable wavelength band than existing EDFAs, and can amplify a light signal of any specified wavelength band within for example the wavelength range of 1450 nm to 1650 nm. However, studies of, optical fibers in this wavelength range have not yet advanced.

DISCLOSURE OF THE INVENTION

It is therefore an object of the present invention to provide a low-dispersion optical fiber with which it is possible to obtain both increased effective core area and reduced chromatic dispersion differential in a used wavelength band and furthermore to reduce loss increases caused by bending and side pressures when the optical fiber is made into a cable, and an optical transmission system using this low-dispersion optical fiber.

A low-dispersion optical fiber of a first construction provided by the invention to achieve this and other objects is a dispersion-shifted optical fiber made by covering a center core with a first side core, covering the first side core with a second side core, and covering the second side core with a cladding, characterized in that when the maximum refractive index of the center core is written n1, the minimum refractive index of the first side core is written n2, the maximum refractive index of the second side core is written n3 and the refractive index of the cladding is written nc, then n1>n3>nc>n2; the relative refractive index difference Δ1 with respect to the cladding of the maximum refractive index of the center core is 0.4%≦Δ1≦0.7%; the relative refractive index difference Δ2 with respect to the cladding of the minimum refractive index of the first side core is −0.30%≦Δ2≦−0.05%; the relative refractive index difference Δ3 with respect to the cladding of the maximum refractive index of the second side core is 0.2%≦Δ3; the ratio (a1/a2) of the diameter a1 of the center core to the diameter a2 of the first side core is at least 0.4 and not greater than 0.7; and the ratio (a3/a2) of the diameter a3 of the second side core to the diameter a2 of the first side core is not greater than 1.6.

A low-dispersion optical fiber of a second construction provided by the invention is characterized in that, in addition to the first construction described above, the second side core is doped with an additive which raises the refractive index of $SiO_2$; the concentration distribution in the optical fiber radial direction of the additive doped into the second side core has a peak; and the position of the peak is on the first side core side of the radial direction center of the second side core.

A low-dispersion optical fiber of a third construction provided by the invention is characterized in that, in addition to the second construction described above, the additive is $GeO_2$.

A low-dispersion optical fiber of a fourth construction provided by the invention is characterized in that, in addition to the first or the second or the third construction described above, a low refractive index cladding part of a smaller refractive index than the cladding is provided between the cladding and the second side core.

A low-dispersion optical fiber of a fifth construction provided by the invention is characterized in that, in addition to the first or the second or the third construction described above, it does not have zero dispersion wavelength in a used wavelength band included in the 1450 nm to 1650 nm wavelength band.

A low-dispersion optical fiber of a sixth construction provided by the invention is characterized in that, in addition to the fourth construction described above, it does not have zero dispersion wavelength in a used wavelength band included in the 1450 nm to 1650 nm wavelength band.

A low-dispersion optical fiber of a seventh construction provided by the invention is characterized in that, in addition to the first or the second or the third or the sixth construction described above, the differential between the maximum value and the minimum value of the dispersion value in a wavelength band having an arbitrary bandwidth of 30 nm included in the wavelength band 1450 nm to 1650 nm is not greater than 2 ps/nm/km.

A low-dispersion optical fiber of an eighth construction provided by the invention is characterized in that, in addition to the fourth construction described above, the differential between the maximum value and the minimum value of the dispersion value in a wavelength band having an arbitrary bandwidth of 30 nm included in the wavelength band 1450 nm to 1650 nm is not greater than 2 ps/nm/km.

A low-dispersion optical fiber of a ninth construction provided by the invention is characterized in that, in addition to the fifth construction described above, the differential between the maximum value and the minimum value of the dispersion value in a wavelength band having a bandwidth of 30 nm included in the wavelength band 1450 nm to 1650 nm is not greater than 2 ps/nm/km.

An optical transmission system of a tenth construction provided by the invention is characterized in that it has an optical transmission line including a low-dispersion optical fiber of any one of the first through ninth constructions described above and a dispersion-compensating device whose chromatic dispersion gradient in the wavelength band 1450 nm to 1650 nm is negative, and a positive chromatic dispersion gradient of the optical transmission line in this wavelength band is reduced by the dispersion-compensating device.

In this specification, the specific refractive indexes Δ1, Δ2 and Δ3 mentioned above are defined by the following expressions (1) through (3).

$$\Delta 1 = \{(n1^2 - nc^2)/2nc^2\} \times 100 \quad (1)$$

$$\Delta 2 = \{(n2^2 - nc^2)/2nc^2\} \times 100 \quad (2)$$

$$\Delta 3 = \{(n3^2 - nc^2)/2nc^2\} \times 100 \quad (3)$$

A low-dispersion optical fiber according to the invention has a first object of providing in a set wavelength band for example within the wavelength range of 1450 nm to 1650 nm both an increased effective core area and a reduced chromatic dispersion differential in the used wavelength band. A low-dispersion optical fiber according to the invention has its refractive index distribution and its core diameter ratios optimized so that it is possible to achieve this first object and also to reduce loss increases caused by bending and side pressures when the optical fiber is made into a cable. Thus, with a low-dispersion optical fiber according to the invention, it is possible to obtain both an increased effective core area and a reduced chromatic dispersion differential in the used wavelength band and furthermore to reduce loss increases caused by bending and side pressures when the optical fiber is made into a cable. Specific examples of low-dispersion optical fibers according to the invention will be discussed hereinafter in the section on modes of practicing the invention.

In one construction of a low-dispersion optical fiber according to the invention, the second side core is doped with an additive which raises the refractive index of $SiO_2$; the concentration distribution in the optical fiber radial direction of the additive doped into the second side core has a peak; and the position of the peak is on the first side core side of the radial direction center of the second side core. And in another construction, a low refractive index cladding part of a smaller refractive index than the cladding is provided between the cladding and the second side core.

In these constructions, effective cutoff wavelength can be made short. Consequently, with these constructions, it is possible to achieve a still greater increase in effective core area and a still greater reduction in the chromatic dispersion differential in the used wavelength band, and a superior low-dispersion optical fiber capable of single mode operation can be obtained.

Also, in a construction wherein, as described above, a peak in the concentration distribution in the optical fiber radial direction of an additive doped into the second side core which raises the refractive index of $SiO_2$ is positioned on the first side core side of the radial direction center of the second side core, if the additive is made $GeO_2$ the optical fiber can be made easily using existing optical fiber manufacturing technology.

And if a low-dispersion optical fiber according to the invention is given a construction such that it does not have zero dispersion wavelength in a used wavelength band within the wavelength range of 1450 nm to 1650 nm, for example in the wavelength band 1530 nm to 1560 nm, if for example wavelength division multiplexing optical transmission is carried out in this wavelength band, the occurrence of four-wave mixing can be suppressed and waveform distortions caused by nonlinear phenomena can consequently be suppressed. The above-mentioned used wavelength band can be set freely within the wavelength range of 1450 nm to 1650 nm.

And if in a low-dispersion optical fiber according to the invention the differential between the maximum value and the minimum value of the dispersion value in the above-mentioned wavelength band is made 2 ps/nm/km or below, when for example wavelength division multiplexing optical transmission is carried out in this wavelength band, waveform distortions caused by chromatic dispersion can be certainly suppressed.

An optical transmission system according to the invention uses an optical transmission line including a low-dispersion optical fiber described above and furthermore the positive chromatic dispersion gradient in the wavelength band 1450 nm to 1650 nm of this optical transmission line including a low-dispersion optical fiber is reduced by means of a negative chromatic dispersion gradient of a dispersion-compensating device. With an optical transmission system according the invention, because the chromatic dispersion gradient in the above-mentioned wavelength band can be made to approach zero and the influence of chromatic dispersion can be suppressed still more, it is possible to build an optical transmission system capable of high-quality wavelength division multiplexing transmission.

BEST MODE FOR CARRYING OUT THE INVENTION

Figure 1:
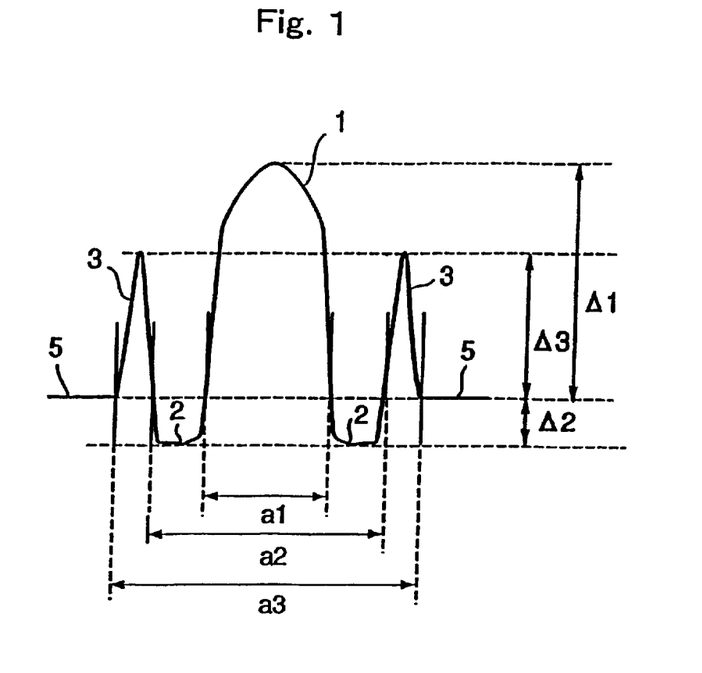
FIG. 1 is a detail construction view showing the refractive index distribution in the radial direction (refractive index distribution over a cross-section) of a first embodiment of a low-dispersion optical fiber according to the invention.

To explain the invention in more detail, a number of embodiments of the invention will now be described on the basis of the accompanying drawings. In the following explanation of the embodiments, parts of the same name as parts in the related art examples have been given the same reference numerals, and duplicate descriptions are omitted. FIG. 1 shows the refractive index profile (refractive index distribution structure) of a first embodiment of a low-dispersion optical fiber according to the invention.

As shown in the figure, this low-dispersion optical fiber has a center core 1 covered by a first side core 2; the first side core 2 is covered with a second side core 3; and the second side core 3 is covered with a cladding 5. Also, in this low-dispersion optical fiber, when the maximum refractive index of the center core 1 is written n1, the minimum refractive index of the first side core 2 is written n2, the maximum refractive index of the second side core 3 is written n2 and the refractive index of the cladding 5 is written nc, then n1>n3>nc>n2.

The most characterizing feature of this first embodiment of the invention is that the relative refractive index difference Δ3 with respect to the cladding 5 of the maximum refractive index of the second side core 3 is made at least 0.2% and the maximum value n2 of the refractive index of the second side core 3 is made much larger than the refractive index nc of the cladding 5. And, in this first embodiment, the relative refractive index difference Δ1 with respect to the cladding 5 of the maximum refractive index of the center core 1 is made at least 0.4% and not greater than 0.7% (0.4%≦Δ1≦0.7%), and the relative refractive index difference Δ2 with respect to the cladding 5 of the minimum refractive index of the first side core 2 is made at least −0.30% and not greater than −0.05% (−0.30%≦Δ2≦−0.05%).

In this first embodiment, preferably, the relative refractive index difference Δ1 with respect to the cladding 5 of the maximum refractive index of the center core 1 is made at least 0.42% and not greater than 0.62%

(0.42%≦Δ1≦0.62%), and the relative refractive index difference Δ2 with respect to the cladding 5 of the minimum refractive index of the first side core 2 is made at least −0.25% and not greater than −0.05% (−0.25%≦Δ2≦−0.05%).

And in this first embodiment, preferably, the ratio (a1/a2) of the diameter a1 of the center core 1 to the diameter a2 of the first side core 2 is made at least 0.4 and not greater than 0.7, and the ratio (a3/a2) of the diameter a3 of the second side core 3 to the diameter a2 of the first side core 2 is made not greater than 1.6. More preferably, the ratio (a3/a2) of the diameter a3 of the second side core 3 to the diameter a2 of the first side core 2 is not greater than 1.5.

In the low-dispersion optical fiber of this first embodiment, the constitution of the optical fiber is not particularly limited. An optical fiber having the refractive index profile described above can be made by for example doping a center core 1 and a second side core 3 with $GeO_2$ and doping a first side core 2 with F. The additive doped into the second side core 3 is not limited to $GeO_2$, and may be some other additive which raises the refractive index of $SiO_2$, for example $Al_2O_3$ or the like.

In the example shown in FIG. 1, the concentration distribution in the optical fiber radial direction of the $GeO_2$ doped into the center core 1 has a peak in the center of the center core 1. And the concentration distribution in the optical fiber radial direction of the $GeO_2$ doped into the second side core 3 also has a peak, in the radial direction center of the second side core 3. The optical fiber may alternatively have a peak in the concentration distribution of the $GeO_2$ in the optical fiber radial direction other than in the center of the center core 1.

In this first embodiment, by the refractive index profile and the ratios of the core diameters of the center core 1, the first side core 2 and the second side core 3 being specified as described above, it is possible to obtain both an increased effective core area and a reduced chromatic dispersion differential in the used wavelength band. And, with the low-dispersion optical fiber of this first embodiment, losses caused by bending in the used wavelength band are small and it is possible to obtain good property when the optical fiber is incorporated into a cable.

In the low-dispersion optical fiber of this first embodiment, specifically, the effective core area is made at least 45 $\mu m^2$, and the absolute value of the dispersion (units: ps/nm/km) anywhere from wavelength 1530 nm to wavelength 1560 nm is made at least 2 and not greater than 12 so that the optical fiber does not have a zero dispersion wavelength in the used wavelength band. Also, in the low-dispersion optical fiber of this first embodiment, the dispersion gradient anywhere in the used wavelength band is made not greater than 0.05 $ps/nm^2/km$ and the difference between the maximum value and the minimum value of the dispersion in the used wavelength band (the dispersion differential) is made not greater than 2 ps/nm/km.

In specifying the refractive index profile and core diameter ratios set forth above, the present inventors obtained the property of various optical fibers by performing trials and simulations. As a result, it was found that when the above-mentioned relative refractive index difference Δ1 is less than 0.4%, although it is possible to realize increased effective core area and reduced chromatic dispersion gradient, bending losses of the optical fiber tend to increase and it is difficult to maintain good property when the optical fiber is made into a cable.

On the other hand it was found that when the relative refractive index difference Δ1 exceeds 0.7%, the chromatic dispersion gradient becomes large; the chromatic dispersion differential becomes larger than in an optical fiber with the dual shaped refractive index profile described above; and the effective core area becomes approximately the same as that of a dual shaped refractive index profile optical fiber. For these reasons, as set forth above, in this first embodiment of the invention, the relative refractive index difference Δ1 was made from 0.4% to 0.7%.

Although the relative refractive index difference Δ1 can be set anywhere within the above range, when the refractive index profile of the center core 1 is an α-power profile, preferably the relative refractive index difference Δ1 is made somewhat small when α is large and is made somewhat large when α is small. The refractive index profile being an α-power profile means that the refractive index has the shape of a curve $y=-x^\alpha$ centered on the center of the core. As a typical example, when α is 4 to 6, the relative refractive index difference Δ1 is preferably made 0.53% to 0.60%.

When the relative refractive index difference Δ2 is made less than −0.30%, although the chromatic dispersion gradient becomes small, the effective core area also becomes small. And when the relative refractive index difference Δ2 is made larger than −0.05%, although the effective core area becomes large, the chromatic dispersion gradient becomes approximately as large as in a dual shaped refractive index profile optical fiber of related art. For these reasons, as set forth above, in this first embodiment of the invention, the relative refractive index difference Δ2 was made −0.30%≦Δ2≦−0.05%.

Also, in an optical fiber with the refractive index profile described above, as the ratio (a1/a2) of the diameter a1 of the center core 1 to the diameter a2 of the first side core 2 becomes smaller, there is the tendency that it becomes more difficult to obtain low bending loss in the 1450 nm to 1650 nm wavelength band. And there is the tendency that effective cutoff wavelength becomes long and single mode operation of the optical fiber becomes difficult. And when the above-mentioned ratio (a1/a2) is less than 0.4, bending loss increase in the 1450 nm to 1650 nm wavelength band becomes marked and the optical fiber is not suitable for use in a cable.

When on the other hand the above-mentioned ratio (a1/a2) is larger than 0.7, obtaining a low chromatic dispersion value becomes difficult, and the optical fiber becomes unsuitable for wavelength division multiplexing optical transmission in the 1450 nm to 1650 nm wavelength band. For these reasons, in this first embodiment of the invention, as set forth above, the above-mentioned ratio (a1/a2) is made at least 0.4 but not greater than 0.7.

And when the diameter of the second side core 3 is large and the ratio (a3/a2) of the diameter a3 of the second side core 3 to the diameter a2 of the first side core 2 exceeds 1.6, effective cutoff wavelength becomes long and single mode operation of the optical fiber becomes difficult. For this reason, in this first embodiment of the invention, this ratio (a3/a2) is made not greater than 1.6.

In this first embodiment, the refractive index profile and the core diameter ratios were specified on the basis of the studies described above. Consequently, both an increased effective core area and a reduced chromatic dispersion differential in the used wavelength band are obtained; the occurrence of four-wave mixing is suppressed; losses caused by bending in the used wavelength band are small; and good property can be obtained when the optical fiber is made into a cable.

In Table 1, as specific examples of this first embodiment of the invention, the relative refractive index differences Δ1, Δ2 and Δ3, the core diameter ratios a1/a2 and a2/a3 and the core diameter a3 in each of a number of examples 1 through 9 are shown together with the property of each example. And the property of examples for comparison are shown in Table 2.

1 through 9 and comparison examples 1 and 2 it was confirmed that this first embodiment of the invention has good property. That is, with this first embodiment of the invention, both an increased effective core area and a reduced chromatic dispersion differential in the used wave-

TABLE 1

| Units | Δ1 % | Δ2 % | Δ3 % | a1/a2 | a2/a3 | chromatic dispersion ps/nm/km | dispersion gradient ps/nm²/km | effecfine core area μm² | bending loss dB/m | dianeter a3 μm |
|---|---|---|---|---|---|---|---|---|---|---|
| Example 1 | 0.50 | −0.05 | 0.40 | 0.45 | 0.80 | 4.1 | 0.044 | 54 | 3.5 | 18.4 |
| Example 2 | 0.58 | −0.15 | 0.35 | 0.42 | 0.75 | −2.5 | 0.035 | 48 | 2.0 | 18.4 |
| Example 3 | 0.47 | −0.10 | 0.42 | 0.475 | 0.80 | 2.6 | 0.026 | 56 | 8.5 | 19.1 |
| Example 4 | 0.57 | −0.15 | 0.45 | 0.464 | 0.78 | 2.2 | 0.045 | 61 | 9.9 | 19.2 |
| Example 5 | 0.55 | −0.10 | 0.37 | 0.445 | 0.75 | 3.2 | 0.032 | 58 | 3.1 | 21.2 |
| Example 6 | 0.54 | −0.12 | 0.41 | 0.457 | 0.81 | 5.8 | 0.054 | 69 | 2.5 | 19.4 |
| Example 7 | 0.53 | −0.15 | 0.35 | 0.533 | 0.75 | 5.2 | 0.046 | 55 | 1.1 | 18.5 |
| Example 8 | 0.56 | −0.20 | 0.27 | 0.67 | 0.68 | 5.2 | 0.048 | 53 | 0.5 | 17.4 |
| Example 9 | 0.58 | −0.20 | 0.31 | 0.63 | 0.71 | 4.0 | 0.045 | 50 | 0.05 | 16.3 |

TABLE 2

| Units | Δ1 % | Δ2 % | a1/a2 | chromatic dispersion ps/nm/km | dispersion gradient ps/nm²/km | effecfine core area μm² | bending loss dB/m |
|---|---|---|---|---|---|---|---|
| conpanisr example 1 | 0.55 | −0.45 | 0.55 | −0.8 | 0.009 | 37 | 8.1 |
| conpanisr example 2 | 0.8 | 0.2 | 0.36 | 0.5 | 0.0845 | 45 | 1.8 |

In Tables 1 and 2, the values of chromatic dispersion, dispersion gradient, effective core area ($A_{eff}$) and bending loss are all values at the wavelength 1550 nm. And bending loss are all values when bending of 20 mm in diameter was applied to the optical fiber. And although it is not shown in Table 1, in the optical fibers of all of the examples 1 through 9, effective cutoff wavelength is on the short wavelength side of the used wavelength band in the wavelength range 1450 nm to 1650 nm, and single mode operation is possible.

In particular, in examples 8 and 9, the bending loss is below 1 dB/m, and not only loss increases caused by bending and side pressures when the optical fiber is made into a cable but also loss increases caused by minute bends can be reduced.

In Table 2, comparison example 1 is a W-shaped refractive index profile optical fiber of the kind shown in FIG. 6B and comparison example 2 is a dual shaped refractive index profile optical fiber of the kind shown in FIG. 6A. In Table 2 also, the relative refractive index difference Δ1 was obtained in the same way as in the first embodiment described above and in the case of comparison example 1 the relative refractive index difference Δ2 was also obtained in the same way as in the first embodiment described above. In the case of comparison example 2, the relative refractive index difference Δ2 shows the relative refractive index difference with respect to the cladding 5 of the maximum refractive index of the first side core 2, and was obtained using the foregoing expression (2) with the maximum refractive index of the first side core 2 as n2 and the refractive index of the cladding 5 as nc.

As is clear from a comparison of the property shown in Tables 1 and 2, in all of examples 1 through 9 the effective core area is larger than in comparison examples 1 and 2 and the dispersion gradient is smaller than in comparison examples 1 and 2. Thus, by a comparison between examples length band are obtained, and also, in the used wavelength band, the loss due to bending when bending of 20 mm in diameter was applied to the optical fiber was small, at under 20 dB/m, so that good property are obtained when the optical fiber is made into a cable.

Figure 2A:
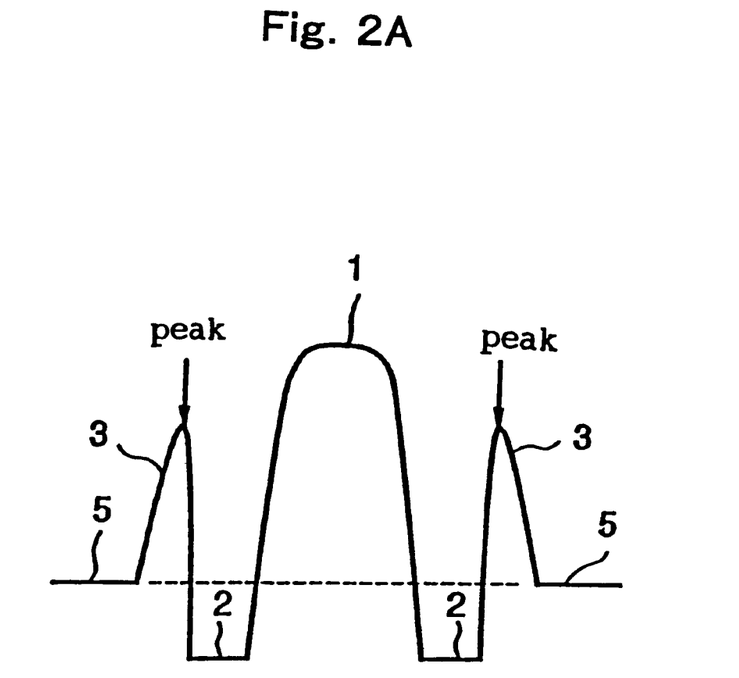
FIG. 2A is a detail construction view showing the refractive index distribution in the radial direction of a second embodiment of a low-dispersion optical fiber according to the invention.

Next, a second embodiment of a low-dispersion optical fiber according to the invention will be described. The second embodiment described here has the refractive index profile shown in FIG. 2A. In this low-dispersion optical fiber, the refractive index peak where the refractive index of the second side core 3 assumes its maximum value is on the first side core 2 side of the radial direction center of the second side core 3. Otherwise, the refractive index profile shown in FIG. 2A is substantially the same as the refractive index profile shown in FIG. 1. Preferably, the refractive index peak of the second side core 3 is as close to the first side core 2 side as possible.

The refractive index profile shown in FIG. 2A is achieved by locating the position of the peak in the optical fiber radial direction of the concentration distribution of $GeO_2$ serving as an additive which raises the refractive index of $SiO_2$ doped into the second side core 3 on the first side core 2 side of the radial direction center of the second side core 3.

Because this second embodiment of the invention has this refractive index profile, there is the effect that effective cutoff wavelength is shortened and single mode operation of the optical fiber is certainly possible over the whole of the used wavelength band.

Figure 2B:
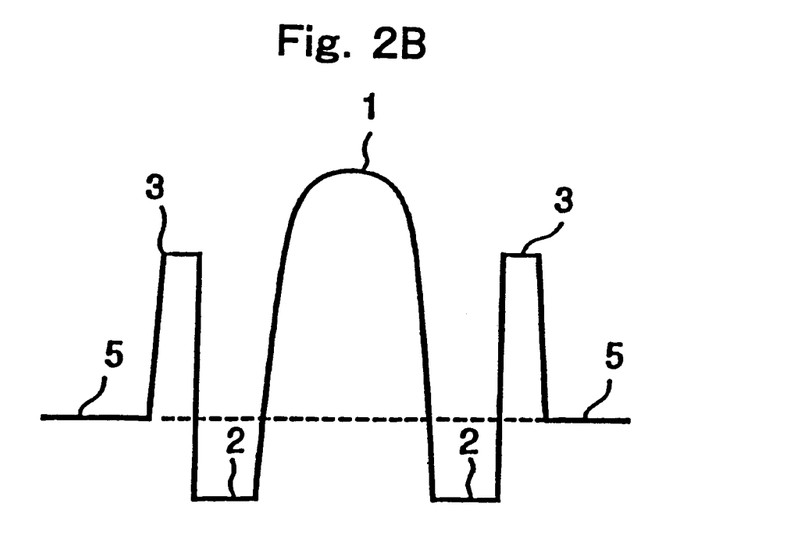
FIG. 2B is an explanatory view showing the refractive index distribution in the radial direction of an optical fiber made for comparison.

Az shown in FIG. 2B with substantially the same construction as in the example 10, the construction and property of an example 10 serving as a specific example of this second embodiment are shown in Table 3. The construction and property of a trial sample 1 wherein the concentration distribution of $GeO_2$ doped into the second side core 3 is made substantially constant in the optical fiber radial direction are also shown in Table 3.

TABLE 3

| Units | Δ1 % | Δ2 % | Δ3 % | a1/a2 | a3/a2 | chromatic dispersion ps/nm/km | dispersion gradient ps/nm²/km | effecfine core area μm2 | effective cutoff wevelength nm |
|---|---|---|---|---|---|---|---|---|---|
| Example 10 | 0.525 | −0.15 | 0.35 | 0.547 | 1.33 | 3.11 | 0.044 | 55 | 1516 |
| trial sample 1 | 0.525 | −0.15 | 0.35 | 0.547 | 1.33 | 3.11 | 0.044 | 56 | 1834 |

Also, as optical fibers having parameters different from those of example 10, the present inventors constructed examples 11 and 12, wherein the position of the peak in the optical fiber radial direction concentration distribution of $GeO_2$ doped into the second side core 3 is close to the first side core 2 side. The constructions and property of these examples 11 and 12 are shown in Table 4. In Table 4, the position of the peak in the optical fiber radial direction concentration distribution of $GeO_2$ in the second side core 3 is expressed with the first side core 2 side taken as 0 and the cladding 5 taken as 1.

Also shown in Table 4 are the constructions and property trial samples 2 and 3 having substantially the same parameters examples 11 and 12 but made with the position of the peak in the optical fiber radial direction concentration distribution $GeO_2$ doped into the second side core 3 closer to the cladding side.

are set within the specified range shown in the description of FIG. 1 to make the effective core area much larger and to reduce the chromatic dispersion differential in the used wavelength band, depending on the set values (for example as in trial sample 1) it sometimes happens that effective cutoff wavelength becomes long.

That is, generally, when a second side core 3 is provided in an optical fiber to increase the effective core area $A_{eff}$, the cutoff wavelength moves to the long wavelength side. And as for example in the case of the trial sample 1 in Table 3 it may happen that the optical fiber will not operate in the single mode in a used wavelength band within the wavelength range 1450 nm to 1650 nm.

In this connection, the present inventors carried out various studies into moving effective cutoff wavelength to the short wavelength side to make single mode operation possible. As a result it was discovered that when the refractive

TABLE 4

| Units | Δ1 % | Δ2 % | Δ3 % | a1/a2 | a3/a2 | position of $GeO_2$ concentration peak | chromatic dispersion ps/nm/km | dispersion gradient ps/nm²/km | effecfine core area μm² | effective cutoff wevelength nm | dianeter a3 μm |
|---|---|---|---|---|---|---|---|---|---|---|---|
| Example 11 | 0.57 | −0.20 | 0.30 | 0.547 | 1.39 | 0.07 | 3.58 | 0.048 | 49 | 1293 | 15.7 |
| Example 12 | 0.57 | −0.20 | 0.30 | 0.547 | 1.39 | 0.29 | 3.49 | 0.047 | 49 | 1321 | 15.8 |
| trial sample 2 | 0.57 | −0.20 | 0.30 | 0.547 | 1.39 | 0.57 | 3.40 | 0.046 | 49 | 1354 | 15.8 |
| trial sample 3 | 0.57 | −0.20 | 0.30 | 0.547 | 1.39 | 0.86 | 3.36 | 0.044 | 48 | 1381 | 15.8 |

As is clear from these tables, effective cutoff wavelength differs greatly with differences in the concentration distribution of $GeO_2$ doped into the second side core 3.

Here, in the examples in Table 4, changes in property of when bending losses are made about 1 dB/m are shown, and there is a tendency for example for the chromatic dispersion and the dispersion gradient to increase slightly when the refractive index peak of the second side core 3 is moved to the first side core 2 side of the radial direction center of the second side core 3. However, it is possible to adjust the chromatic dispersion and the dispersion gradient value by a method other than moving the refractive index peak of the second side core 3. For example, the refractive index of the center core 1 or the first side core 2 can be changed.

Preferably, the effect of adjusting the dispersion value and the dispersion gradient is obtained by moving the position of the refractive index peak of the second side core 3 into the ⅓ of the width of the second side core 3 on the first side core 2 side. This is also preferable from the points of view of manufacturability and manufacturing dispersion.

The present inventors found that when the relative refractive index differences Δ1, Δ2 and Δ3, the ratio (a1/a2) of the diameter a1 of the center core 1 to the diameter a2 of the first side core 2 and the ratio (a3/a2) of the diameter a3 of the second side core 3 to the diameter a2 of the first side core 2 index distribution of the second side core 3 is made the kind of distribution shown for example in FIG. 2A, as in example 10, example 11 and example 12, it is possible to shorten effective cutoff wavelength and realize increased effective core area and reduced chromatic dispersion differential in the used wavelength band to a much higher level.

That is, as in example 10, example 11 and example 12 shown in FIG. 2A and Table 3 and Table 4, the refractive index peak of the second side core 3 is brought to the first side core 2 side of the radial direction center of the second side core 3. This moves the cutoff wavelength to the short wavelength side and makes it possible to obtain an optical fiber which can operate in the single mode in a used wavelength band within the wavelength range 1450 nm to 1650 nm.

The inventors consider the reason for this to be as follows. Of the propagation modes of the optical fiber, the $LP_{0m}$ (m=2, 3, . . . ) and $LP_{11}$ modes have an electric field distribution in a wide range in the optical fiber radial direction. Consequently, by moving the refractive index peak of the second side core 3 to the first side core 2 side of the radial direction center of the second side core 3 it is possible to prevent light from propagating in the $LP_{0m}$ mode and the $LP_{11}$ mode while keeping the influence on the $LP_{01}$ mode of light propagating through the optical fiber small, and thus make single mode operation possible.

The construction of the first embodiment of the invention was specified as described above on the basis of this study, and provides the beneficial effects mentioned above as shown in Table 3 and Table 4.

A third embodiment of a low-dispersion optical fiber according to the invention will now be described. This third embodiment has the refractive index profile shown in FIG. 3. This refractive index profile is substantially the same as that shown in FIG. 1, except that a low refractive index cladding part 4 having a lower refractive index than the cladding 5 is provided between the cladding 5 and the second side core 3.

The inventors carried out on a low-dispersion optical fiber having this construction the same study as the study carried out to specify the construction shown in FIG. 2A. The construction shown in FIG. 3 was specified on the basis of this study, and by providing the low refractive index cladding part 4 it is possible to obtain the same effect as when the refractive index peak at which the refractive index of the second side core assumes its maximum value is moved to the first side core 2 side of the radial direction center of the second side core 3.

Figure 3:
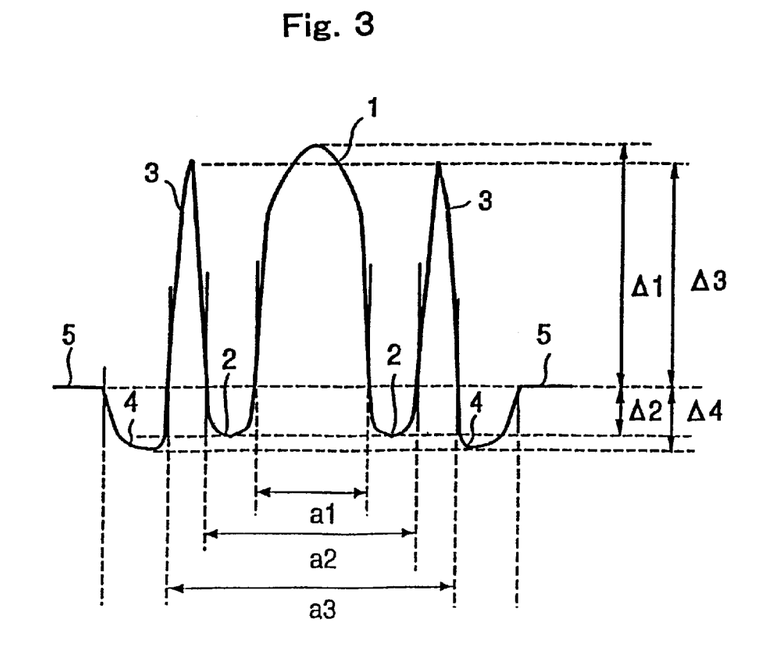
FIG. 3 is a detail construction view showing the refractive index distribution in the radial direction of a third embodiment of a low-dispersion optical fiber according to the invention.

Table 5 shows the construction and property of an example serving as a specific example of this embodiment having the low refractive index cladding part 4 and the construction and property of a trial sample 4 made with substantially the same construction as the example 13 but without the low refractive index cladding part 4. As is clear from this table, by providing the low refractive index cladding part 4 between the cladding 5 and the second side core 3 it is possible to shorten effective cutoff wavelength.

Figure 5A:
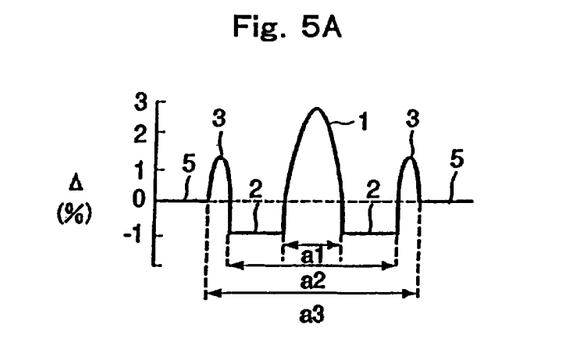
FIG. 5A is an explanatory view showing the refractive index distribution and FIG. 5B a graph showing the dispersion characteristic of a dispersion-compensating device applied to the above-mentioned embodiment of an optical transmission system.

In the dispersion-compensating optical fiber, if the maximum refractive index of the center core 1 is written n1, the minimum refractive index of the first side core 2 is written n2, the maximum refractive index of the second side core 3 is written n3 and the refractive index of the cladding 5 is written nc, then n1>n3>nc>n2. And in this dispersion-compensating optical fiber the values of the relative refractive index differences Δ1, Δ2 and Δ3 are different from in the embodiments of low-dispersion optical fibers according to the invention described above, with Δ1 being about 2.85%, Δ2 being about −1% and Δ3 being about 1.28%. And the core diameter ratios (a1/a2/a3) are approximately 1/3/3.7.

The dispersion property of the dispersion-compensating device in the 1450 nm to 1650 nm wavelength band has a negative dispersion (for example about −150 ps/nm/km or below at wavelength 1550 nm) and a negative chromatic dispersion gradient (about −2.18 ps/nm$^2$/km), and the absolute values of these are both large. Accordingly, in the optical transmission system, the ratio of the length of the low-dispersion optical fiber of example 7 to the length of the dispersion-compensating device was made 98 to 2.

Figure 4:
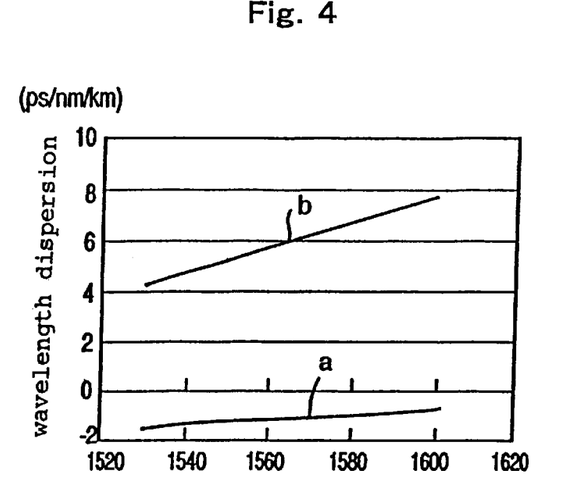
FIG. 4 is a graph showing the dispersion characteristic of an embodiment of an optical transmission system using a low-dispersion optical fiber according to the invention together with the dispersion property of the low-dispersion optical fiber applied to this optical transmission system.

In the 1530 nm to 1600 nm wavelength band, the optical transmission system has the dispersion property shown by the curve a in FIG. 4. Curve b in FIG. 4 shows the dispersion characteristic in the 1530 nm to 1600 nm wavelength band of the low-dispersion optical fiber of example 7.

Figure 5B:
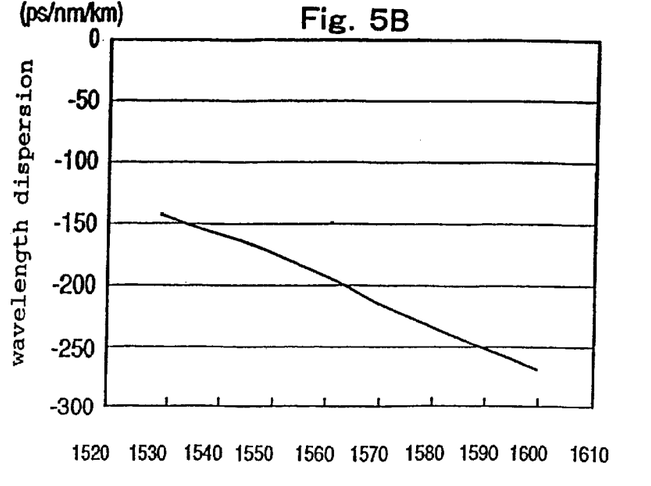

As is clear from FIG. 4, when an optical transmission system is built by connecting a dispersion-compensating device having the kind of negative chromatic dispersion gradient shown in FIG. 5B to the low-dispersion optical fiber 7, the dispersion differential in the used wavelength band (in

TABLE 5

| Units | Δ1 % | Δ2 % | Δ3 % | Δ4 % | a1/a2 | a3/a2 | a4/a3 | chromatic dispersion pa/nm/km | dispersion gradient ps/nm$^2$/km | effecfine core area $\mu m^2$ | effective cutoff wevelength nm | dianeter a3 $\mu m$ |
|---|---|---|---|---|---|---|---|---|---|---|---|---|
| Example 13 | 0.425 | −0.17 | 0.415 | −0.20 | 0.475 | 1.35 | 1.80 | 4.82 | 0.046 | 64 | 1498 | 21.9 |
| trial sample 4 | 0.425 | −0.17 | 0.415 | | 0.475 | 1.35 | | 5.251 | 0.022 | 67 | 2407 | 24.2 |

Next, an embodiment of an optical transmission system according to the invention will be described. This optical transmission system has an optical transmission line including at least one low-dispersion optical fiber according to one of the embodiments described above and a dispersion-compensating device whose chromatic dispersion gradient in the wavelength band 1450 nm to 1650 nm is negative. And it is a characterizing feature of this optical transmission system that the positive chromatic dispersion gradient of the optical transmission line including the low-dispersion optical fiber is reduced by means of the dispersion-compensating device.

As an example, an optical transmission system was constructed by connecting a low-dispersion optical fiber having the construction and property of example 7 in Table 1 with a dispersion-compensating device having negative dispersion and a negative chromatic dispersion gradient.

A dispersion-compensating device for this application was made using a dispersion-compensating optical fiber having the kind of refractive index profile shown in FIG. 5A. That is, a dispersion-compensating device was made using a dispersion-compensating optical fiber having a first side core 2 covering a center core 1, a second side core 3 covering the first side core 2, and a cladding 5 covering the second side core 3.

this case a wavelength band within the wavelength range 1450 nm to 1650 nm) in the optical transmission system as a whole can be reduced much further. And an example of a dispersion-compensating device applied in this embodiment of an optical transmission system according to the invention is a device having a negative chromatic dispersion gradient with a large absolute value as mentioned above.

When this kind of dispersion-compensating device is applied, as described above, the length of the device can be made short. Therefore, the application of this kind of dispersion-compensating device reduces the amount of influence had on nonlinear property and the like other than the dispersion property and makes it possible to construct an optical transmission system having the good property of the low-dispersion optical fibers of the foregoing embodiments and capable of high-quality wavelength division multiplexing transmission.

The present invention is not limited to the embodiments described above, and various modes of practicing the invention can be employed. For example, in an optical transmission system according to the invention an optical transmission line including a low-dispersion optical fiber of one of the foregoing embodiments and a dispersion-compensating device having a negative chromatic dispersion gradient in the used wavelength band are combined to reduce the dispersion differential in the used wavelength band. Therefore, in an embodiment of an optical transmission system according to the invention, the optical transmission line may be made by connecting to a low-dispersion optical fiber of one of the foregoing embodiments another optical fiber, for example an optical fiber capable of single mode operation.

And the construction of the dispersion-compensating device applied to the embodiment of the optical transmission line is not particularly limited and can be set according to convenience. However, when the dispersion-compensating device is made using a dispersion-compensating optical fiber as described above, the making of the device and its connection to an optical transmission line including a low-dispersion optical fiber can be carried out easily.

And, in the embodiments of low-dispersion optical fibers described above, $GeO_2$ was doped into the center core 1 and the second side core 3 and F was doped into the first side core 2. However, an embodiment of a low-dispersion optical fiber according to the invention may alternatively be given a refractive index profile of a kind shown in FIG. 1, FIG. 2 or FIG. 3 by $GeO_2$ and F being doped into the first side core 2 and the doping amounts of these being adjusted. Also, the composition of a low-dispersion optical fiber according to the invention can be set variously.

Also, although in each of the foregoing embodiments the low-dispersion optical fiber was constructed not to have zero dispersion wavelength in the 1530 nm to 1560 nm wavelength band, a low-dispersion optical fiber according to the invention may be constructed not to have zero dispersion wavelength in any used wavelength band included in the wavelength band 1450 nm to 1650 nm. When a low-dispersion optical fiber according to the invention is constructed like this, because the occurrence of four-wave mixing when wavelength division multiplexing transmission is carried out in the used wavelength band can be suppressed, it is possible to obtain a low-dispersion optical fiber suited to wavelength division multiplexing transmission over a wider bandwidth.

INDUSTRIAL APPLICABILITY

As described above, a low-dispersion optical fiber according to this invention and an optical transmission system using such a low-dispersion optical fiber can provide both increased effective core area and reduced chromatic dispersion differential in a used wavelength band and are therefore well-suited to wavelength division multiplexing transmission.

What is claimed is:

1. A low-dispersion optical fiber that is a dispersion-shifted optical fiber comprising:
    a center core having a maximum refractive index n1, and a diameter a1;
    a first side core that covers the center core and has a minimum refractive index n2, and a diameter a2;
    a second side core that covers the first side core and has a maximum refractive index n3, and a diameter a3; and
    a cladding that covers the second side core and has a refractive index nc, wherein n1>n3>nc>n2,
    a relative refractive index difference Δ1 of the maximum refractive index of the center core with respect to the cladding is 0.4%≦Δ1≦0.7%,
    a relative refractive index difference Δ2 of the minimum refractive index of the first side core with respect to the cladding is −0.30%≦Δ2≦−0.05%,
    a relative refractive index Δ3 of the maximum refractive index of the second side core with respect to the cladding is 0.2%≦Δ3,
    a ratio a1/a2 is at least 0.4 and not greater than 0.7, and
    a ratio a3/a2 is not greater than 1.6.

2. The low-dispersion optical fiber of claim 1, wherein:
    the second side core is doped with an additive that raises a refractive index of $SiO_2$;
    a concentration distribution in an optical fiber radial direction of the additive that is doped into the second side core having a peak; and
    a position of the peak is on a first side core side of the radial direction center of the second side core.

3. The low-dispersion optical fiber according to claim 2, wherein:
    the additive is $GeO_2$.

4. The low-dispersion optical fiber of claim 1, further comprising:
    a low refractive index cladding part having a lower refractive index than the cladding and being disposed between the cladding and the second side core.

5. The low-dispersion optical fiber according to claim 1, wherein:
    a property of the low-dispersion optical fiber is to not have a zero dispersion wavelength in a predetermined sub-band of a 1450 nm to 1650 nm wavelength band that is used for optical communications.

6. The low-dispersion optical fiber according to claim 4, wherein:
    a property of the low-dispersion optical fiber is to not have a zero dispersion wavelength in a predetermined sub-band of a 1450 nm to 1650 nm wavelength band that is used for optical communications.

7. The low-dispersion optical fiber according to claim 1, wherein:
    a differential between a maximum value and a minimum value of a dispersion value in a wavelength band having an arbitrary bandwidth of 30 nm included in a wavelength band 1450 nm to 1650 nm is not greater than 2 ps/nm/km.

8. The low-dispersion optical fiber according to claim 6, wherein:
    a differential between a maximum value and a minimum value of a dispersion value in a wavelength band having a predetermined bandwidth of 30 nm included in a wavelength band 1450 nm to 1650 nm is not greater than 2 ps/nm/km.

9. The low-dispersion optical fiber according to claim 4, wherein:
    a differential between a maximum value and a minimum value of a dispersion value in a wavelength band having a bandwidth of 30 nm included in a 1450 nm to 1650 nm wavelength band is not greater than 2 ps/nm/km.

10. The low-dispersion optical fiber according to claim 5, wherein:
    a differential between a maximum value and a minimum value of a dispersion value in a wavelength band having a predetermined bandwidth of 30 nm included in a 1450 nm to 1650 nm wavelength band is not greater than 2 ps/nm/km.

11. An optical transmission system comprising:
    an optical transmission line including a low-dispersion optical fiber having
        a center core having a maximum refractive index n1, and a diameter a1, a first side core that covers the center core and has a minimum refractive index n2, and a diameter a2, a second side core that covers the first side core and has a maximum refractive index n3, and a diameter a3, and a cladding that covers the second side core and has a refractive index nc; and a dispersion-compensating device having a chromatic dispersion gradient in a wavelength band 1450 nm to 1650 nm that is negative, wherein n>n3>nc>n2, a relative refractive index difference Δ1 of the maximum refractive index of the center core with respect to the cladding is $0.4\% \leq \Delta1 \leq 0.7\%$, a relative refractive index difference Δ2 of the minimum refractive index of the first side core with respect to the cladding is $-0.30\% \leq \Delta2 \leq -0.05\%$, a relative refractive index Δ3 of the maximum refractive index of the second side core with respect to the cladding is $0.2\% \leq \Delta3$, a ratio a1/a2 is at least 0.4 and not greater than 0.7, a ratio a3/a2 is not greater than 1.6, and a positive chromatic dispersion gradient of the optical transmission line in the 1450 nm to 1650 nm wavelength band being reduced by the dispersion-compensating device.

12. The optical transmission system of claim 11, wherein:

the second side core is doped with an additive that raises a refractive index of $SiO_2$;

a concentration distribution in an optical fiber radial direction of the additive that is doped into the second side core having a peak; and a position of the peak is on a first side core side of the radial direction center of the second side core.

13. The optical transmission system of claim 12, wherein:

the additive is $GeO_2$.

14. The optical transmission system of claim 11, further comprising:

a low refractive index cladding part having a lower refractive index than the cladding and being disposed between the cladding and the second side core.

15. The optical transmission system of claim 11, wherein:

a property of the low-dispersion optical fiber is to not have a zero dispersion wavelength in a predetermined sub-band of a 1450 nm to 1650 nm wavelength band that is used for optical communications.

16. The optical transmission system of claim 14, wherein:

a property of the low-dispersion optical fiber is to not have a zero dispersion wavelength in a predetermined sub-band of a 1450 nm to 1650 nm wavelength band that is used for optical communications.

17. The optical transmission system of claim 11, wherein:

a differential between a maximum value and a minimum value of a dispersion value in a wavelength band having an arbitrary bandwidth of 30 nm included in a wavelength band 1450 nm to 1650 nm is not greater than 2 ps/nm/km.

18. The optical transmission system of claim 16, wherein:

a differential between a maximum value and a minimum value of a dispersion value in a wavelength band having a predetermined bandwidth of 30 nm included in a wavelength band 1450 nm to 1650 nm is not greater than 2 ps/nm/km.

19. The optical transmission system of claim 14, wherein:

a differential between a maximum value and a minimum value of a dispersion value in a wavelength band having a bandwidth of 30 nm included in a 1450 nm to 1650 nm wavelength band is not greater than 2 ps/nm/km.

20. The optical transmission system of claim 15, wherein:

a differential between a maximum value and a minimum value of a dispersion value in a wavelength band having a predetermined bandwidth of 30 nm included in a 1450 nm to 1650 nm wavelength band is not greater than 2 ps/nm/km.

* * * * *